UNITED STATES PATENT OFFICE 2,660,601

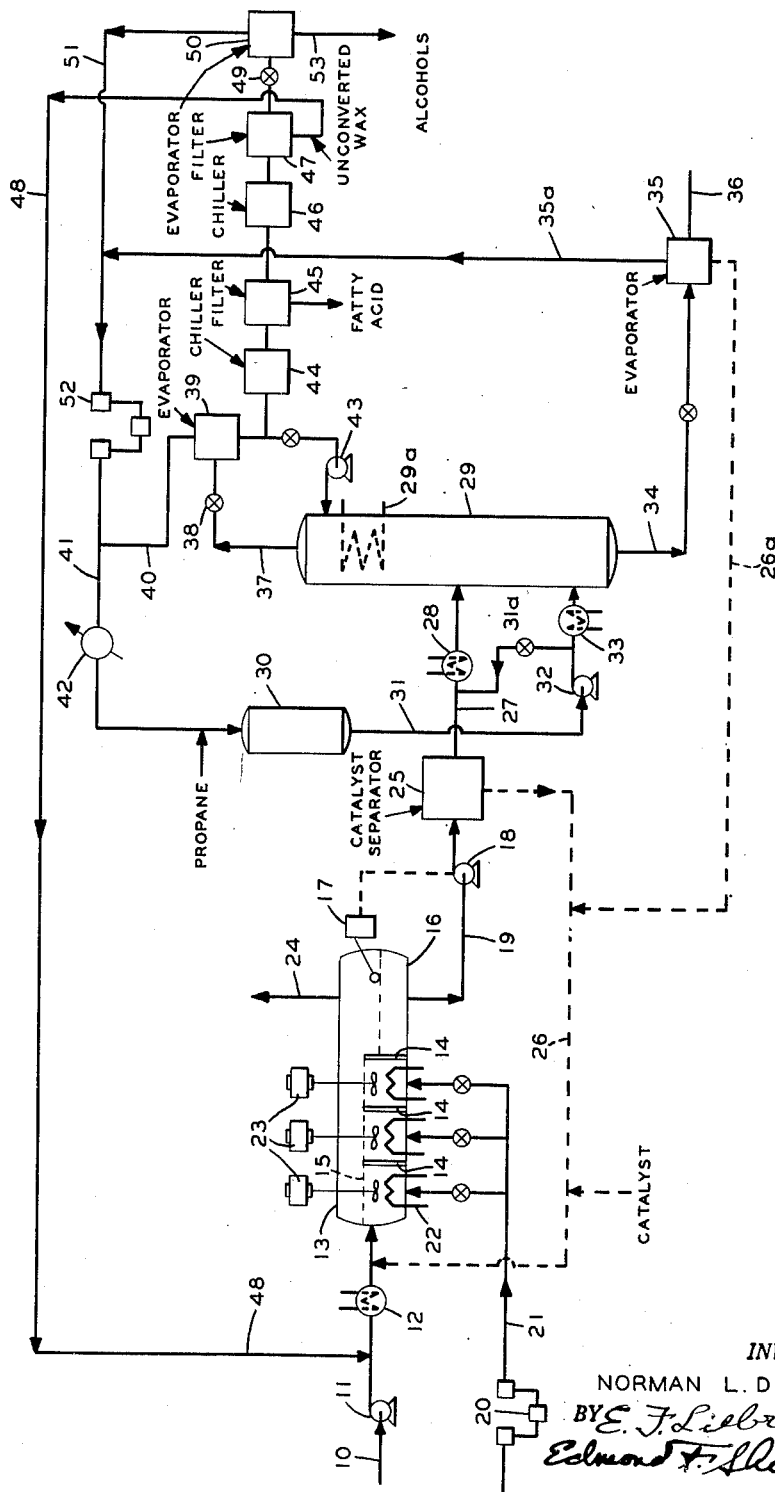

SEPARATION OF FATTY ACIDS FROM HYDROCARBON SOLUTIONS THEREOF

Norman L. Dickinson, Basking Ridge, N. J., assignor to The M. W. Kellogg Company, Jersey City, N. J., a corporation of Delaware Application August 30, 1948, Serial No. 46,858

3 Claims. (Cl. 260—452)

This invention relates in general to the manufacture of synthetic fatty acids or other oxygenated high molecular weight hydrocarbons by the catalytic oxidation of hydrocarbons in the liquid phase and more particularly it relates to an improved process in which the oxidation effluent is subjected to solvent fractionation with a low boiling solvent in the paracritical range in order to separate the oxygenated products from the unreacted or incompletely reacted material; the unreacted and partially reacted material is then recycled to the catalytic oxidation step.

The invention is concerned with those hydrocarbons having between 16 and 30 carbon atoms per molecule. These may be oxidized in a liquid state at moderate temperatures (ordinarily at temperatures less than 400° F.) in the presence of known catalytic agents so as to produce a mixture of oxygenated products including substantial amounts of free fatty acids.

Although it has been known for some time that heavy alcohols, naturally occurring waxes, or those obtained in the so-called Gatsch fraction of the Fischer-Tropsch process can be so oxidized with air or oxygen in the presence of a permanganate solution to produce fatty acids, the process has not been successful in competing economically with natural animal and vegetable sources except in countries cut off from access to natural fats by war.

Although the conversion in the oxidation step (as is known in the art) may be varied within broad limits, it is found that the yield of pure acid (basis hydrocarbon consumed) declines as the conversion per pass increases. Moreover, the quality of the recovered acid fraction becomes poorer due to increasing hydroxylation, dehydrogenation, and cracking. In other words, the maximum yield of the highest quality product is characteristically obtained at very low conversions. On the other hand, because of the difficulty and high cost of separating product from recycle hydrocarbons by conventional means, the conversion has heretofore been kept relatively high (recycle ratio kept low) in order to hold the operating expense within practical limits. This situation has required choosing a compromise conversion which is too high to yield product of best quality, yet too low to be particularly economical. It is a major object of this invention, by providing a more efficient method of separating between product and recycle, to make economically feasible the production of higher quality product (at reduced conversion per pass) or to lower the cost of manufacturing acids of a given quality (at conversions per pass similar to those ordinarily used).

In its simplest version the subject invention provides for the separation of the oxidation effluent into only two fractions, namely a fatty acid-rich product and a recycle material containing substantially all of the unreacted hydrocarbons. At low conversions this procedure results in a product of excellent quality. At higher conversions the acid so separated contains appreciable hydroxy acid which detracts from its value in some uses. Moreover, the recycle will usually contain substantial amounts of alcohols and other hydroxy and carbonyl containing compounds, which it may be desirable to separate as products. An oxidation effluent typical of high conversion operation was composed of the following:

27% alcohols
37% aliphatic acids
3.5% hydroxy acids
30.5% unconverted wax

By solvent fractionation with certain solvents under paracritical conditions as described hereinafter, most of the acids and hydroxy acids in this effluent can be precipitated into a raffinate, while almost all of the alcohols and unconverted wax can be withdrawn in an extract phase and recycled to the oxidation step.

However, since the hydroxy acids are generally unwanted impurity in the acid product, it is possible to conduct the fractionation under such conditions that only the hydroxy acids are precipitated as raffinate. The extract phase is then charged to a second and similar fractionation step in which somewhat different conditions of operation are employed so as to precipitate the pure aliphatic acids as raffinate. The extract from the second fractionation may then be recycled to the oxidation step or subjected to a further separation between unconverted hydrocarbons and oxygenated compounds, for example by chilling and filtering.

The fractionation is accomplished by treating the reaction products with a relatively low boiling solvent in a temperature range, called the paracritical range, near but slightly below the critical temperature of the solvent, usually within one hundred degrees of the critical temperature. Most such solvents are normally gaseous and must be employed under conditions of substantially superatmospheric pressure in order to maintain the solution in a liquid condition. When solvent and reaction effluent are so contacted two homogeneous liquid phases of differing densities are formed. When the fractionation temperature and other conditions are properly adjusted, the heavier or raffinate phase contains most of the oxygenated products and the lighter or extract phase most of the unreacted material. The distinguishing feature of paracritical fractionation is that it is carried out in a temperature range in which solubility decreases as temperature increases in the vicinity of the critical temperature of the solvent. When the reaction effluent is contacted with solvent in the lower part of this range of temperatures, an extract phase containing a mixture of both the desired extract recycle and the desired raffinate products can be formed; but if the temperature is adjusted upwardly, one component after another can be precipitated into the raffinate until the desired product fraction is entirely in the raffinate. Of course, an optimum temperature for continuous operation may be reached; but conditions may be altered quickly and precisely by increasing the temperature if it is desired to shave a fraction of the effluent out of the extract phase; or, conversely, a slightly larger cut of the extract fraction may be taken by reducing the temperature within the paracritical range.

The low molecular weight hydrocarbons are particularly advantageous for use in the process as solvents, and of these the low molecular weight paraffin hydrocarbons are especially useful because they are inert to all constituents of the treated material. Consequently, low boiling normally gaseous hydrocarbons such as methane, ethane, propane, and butane are preferred for use as solvent in the process although the use of corresponding olefin hydrocarbons, or of carbon dioxide, sulfur hexafluoride, sulfur dioxide, carbon disulphide, dimethyl ether, ammonia, halogenated hydrocarbons such as dichlorodifluoromethane and the like, are not excluded. One solvent preferred for the process by reason of its miscibility with the treated materials at relatively low temperature and the relative ease with which it can be recovered from the extract and raffinate is propane. Mixtures of ethane and propane, or mixtures of propane and butane may also be employed advantageously. The class of solvents preferred for the present method are those having a critical temperature not greater than about 450° F. However, it is possible to practice the method with any solvent which has, in addition to the properties implied by the term solvent (inertness, stability etc.) the property of being low boiling relative to the material being fractionated; this property is necessary in order to make possible fractionation in the paracritical range of the solvent without loss of the charge material.

The solvent fractionation step may be carried out in a batch operation in which the mixture of solvent and oil is brought to the temperature and pressure for the desired phase separation in an enclosed chamber. The preferred form of the process, however, would employ a solvent fractionation tower to which solvent and oxidation effluent would be continuously passed in countercurrent contact. Extract and raffinate would be continuously withdrawn and, if desired, any of the many methods for controlling the process may be used; for instance, a temperature gradient within the tower, refluxing or other means known to those familiar with the art.

Any oxidizing agent, gas, liquid, or even solid, capable of oxidizing hydrocarbons to oxygenated compounds, may be used. Likewise any substance capable of promoting and controlling the oxidation may be used as catalyst.

It may be observed that, in certain circumstances it may be desirable to conduct the separated "recycle," i. e. unconverted or partially converted hydrocarbons, to a second oxidation zone, operated under conditions of temperature, catalyst, etc., somewhat different from those maintained in the first oxidation zone.

The process is shown diagrammatically in the drawing. Hydrocarbon waxes of the class $C_{16}$ to $C_{30}$ obtained as a fraction of the product of a process like the Fischer-Tropsch process are the usual charge materials but petroleum waxes may also be used. The charge for a given operation is preferably limited to about a "four carbon cut": i. e. in the charge to a given system the heaviest and lightest hydrocarbons should not differ by more than about four carbon atoms in molecular carbon content. The maximum difference in carbon atoms per molecule in given charge material is about six; greater differences produce an effluent which is not satisfactorily fractionated.

The charge is introduced into the system through line 10 by means of pump 11, being preheated in heater 12. Although any suitable means may be used for the oxidation step, a preferred means is a horizontally extended tank 13, within which are several transverse vertical baffles 14 adapted to form a series of troughs for charge introduced at one end through line 10. Incoming charge fills the first trough to a liquid level 15 and overflows into each successive trough as it progresses from the inlet end of tank 13 to the outlet end 16. Preferably, a liquid level controller 17 controls the operation of a pump 18 which withdraws oxidation effluent from the outlet end 16 of tank 13 through line 19 at a rate sufficient to maintain a substantially lower level of liquid in the trough nearest outlet end 16. The oxygen for the oxidation process is obtained from air or an oxidizing gas introduced by compressor 20 through pipe system 21 which bubbles the air upwardly from the bottom of each trough. Cooling coils 22 are provided in each trough in order to maintain the desired reaction temperature by removing excess reaction heat. These coils are shown only diagrammatically but a preferred construction would be in the form of a cylindrical helix vertically positioned so that mixers 23 may be located within the helical coil and serve to mix the reactants intimately and cause them to circulate about the cooling surfaces. Vent 24 is provided for the escape of depleted air and water vapor produced by the reaction. In the reaction vessel described, the ratio at which one reactant is brought into contact with the other can be carefully controlled in each of the transverse troughs of vessel 13, and the temperature limited not only by control of this ratio but also by cooling coils 22.

The oxidation effluent withdrawn through line 19 is passed to a separating system 25 of any conventional or suitable type such as filters or settlers in which catalyst is recovered and recycled by suitable means 26 for mixture with incoming charge in line 10. The catalyst-free effluent passes through line 27 and heat exchanger 28 (for heating or cooling as the case may require) to a solvent fractionation tower 29.

For purposes of the present description, propane will be employed as the solvent. Propane is withdrawn from propane storage tank 30 through line 31 and pumped by means of pump 32 into the lower end of fractionation tower 29. The fractionation of the effluent is carried out in the paracritical range of the solvent, i. e. in a temperature range near the critical temperature of the solvent in which solubility decreases as temperature increases; for propane, this range is between about 150° F. and the critical temperature of the mixture of effluent and propane, usually not more than 250° F. Preferably, the incoming propane is heated by means of a heater 33 to assure contacting with effluent oil at a paracritical temperature. If desired, propane may be introduced into the oil in line 27 by means of line 31a. Since at such temperatures, the propane would be gaseous at atmospheric pressure, it is necessary to maintain a superatmospheric pressure within tower 29 sufficient to prevent vaporization of the propane and the propane-effluent solution. Under these conditions the unreacted hydrocarbons are more soluble in the propane than are the fatty acids or other oxygenated products. The composition of the fractions may be controlled by selection of temperature and pressure conditions within the paracritical range, an increasing proportion of the effluent being rejected into the raffinate as critical conditions are approached. Tower 29 may be provided with a heating coil 29a in order to more precisely control the fractionation of effluent by rejecting from the upflowing extract phase any raffinate material. A raffinate phase is withdrawn from the lower end of tower 29 through line 34, freed of its propane by evaporating means 35, and withdrawn through line 36 as a product of the process; propane is returned to the system through line 35a. It is a convenient modification of the invention to recover catalyst from the raffinate phase at this point instead of in separator 25; the recovered catalyst is recycled to the oxidation step as indicated by dashed lines 26 and 26a.

The extract phase moves upwardly through tower 29 and is withdrawn through line 37 and pressure reduction valve 38 to an evaporator 39 in which a substantial part of the propane is vaporized to approximately the pressure in storage tank 30. The vaporized propane may be recycled through line 40, and line 41 to be condensed by cooler 42 and returned to storage tank 30. A part of the remaining extract phase may be pumped back to tower 29 by means of pump 43 in order to serve as reflux liquid in contact with the extract phase. The remainder of the extract phase may be chilled, for example to approximately zero degrees Fahrenheit, in chiller 44 and filtered in filter 45 to separate precipitated fatty acid which has been carried up with the extract phase. The remaining liquid may be again chilled in chiller 46, for example to approximately −40° F., and filtered in filter 47 in order to recover a precipitate of unconverted wax and a filtrate containing propane and rich in alcohols. The temperatures specified are typical but not limiting; in various cases fatty acids may be separated at temperatures between −10° F. and 20° F., and the unconverted wax may be precipitated at temperatures 15° or more below that at which the fatty acids precipitate, usually between −20° F. and −50° F. The unconverted wax is recycled through line 48 to be mixed with fresh charge in line 10 and then again subjected to the oxidation step. The filtrate may be passed through the pressure reduction valve 49 and heated or stripped in evaporator 50 to expel propane which may be recycled through line 51, pump 52, line 41 and cooler 42 to propane storage tank 30. The alcohols may be withdrawn at line 53 as a product of the process. It is to be understood, of course, that both alcohols and unconverted waxes may be recycled to the oxidation step without the necessity of any separation by chiller 46 and filter 47. Furthermore, a second propane tower may be used instead of the chilling step to fractionate the extract phase.

It is not necessary that unconverted waxes and alcohols which are recycled to the oxidation step be entirely free of propane. If desired, a substantial part of the propane may be retained as diluent in the recycle material. This results in the advantages of decreased viscosity and improved heat transfer properties of the mixture in the oxidation step. However, this necessitates carrying out the oxidation step under superatmospheric pressure; and means for recovering propane from the gases discharged through line 24.

The raffinate phase may be fractionated into components by chilling and filtering or by secondary propane fractionation in the same manner as that described in connection with the extract phase.

One of the preferred uses for the present method is the production of synthetic fats. Product withdrawn through line 36 may be contacted with glycerine in order to convert the fatty acids to fats and obtain a fatty product. Likewise, esters and soaps may be produced by the additional steps of esterification or saponification respectively. In these instances, the additional steps may be conducted in the presence of unseparated solvent.

I claim:

1. A process for synthesizing fatty acids by the catalytic oxidation of hydrocarbon waxes having a molecular carbon content in the range between about 16 and about 30 carbon atoms, which involves the steps of: continuously flowing said waxes in a liquid state through a reaction zone and intimately contacting said waxes with an oxidizing gas and an oxidation catalyst therein; continuously withdrawing effluent from said zone and introducing said effluent into a vertically extended fractionation zone having a solvent inlet and raffinate phase outlet near the lower end, an extract phase outlet near the upper end, and an effluent inlet in the intermediate portion; continuously introducing into said fractionation zone through said solvent inlet a solvent having a critical temperature not exceeding about 450° F. and countercurrently contacting said effluent with said solvent under liquefying pressure; adjusting the temperatures within said fractionation zone in the range near the critical temperature of the solvent in which solubility decreases as temperature increases to separate said solvent and effluent mixture into an extract phase containing a concentration of alcohols and other incompletely oxygenated products, and a raffinate phase containing a concentration of fatty acids which are soluble in said solvent at lower temperatures; continuously withdrawing extract and raffinate phases from said extract and raffinate phase outlets respectively; separating catalyst from said raffinate phase and recycling it to said reaction zone; and recovering a fatty acid product from the remainder of said raffinate phase.

2. A process for synthesizing fatty acids by the catalytic oxidation of hydrocarbon waxes having a molecular carbon content in the range between about 16 and about 30 carbon atoms, which involves the steps of: continuously flowing said waxes in a liquid state through a reaction zone and intimately contacting said waxes with gaseous oxygen and an oxidation catalyst therein; continuously withdrawing effluent from said zone and introducing said effluent into a vertically extended fractionation zone having a solvent inlet and raffinate phase outlet near the lower end, an extract phase outlet near the upper end, and an effluent inlet in the intermediate portion; continuously introducing into said zone through said solvent inlet a solvent having a critical temperature not exceeding about 450° F. and countercurrently contacting said effluent with said solvent under liquefying pressure; adjusting the temperatures within said fractionation zone in the range near the critical temperature of the solvent in which solubility decreases as temperature increases to separate said solvent and effluent mixture into an extract phase containing a concentration of alcohols and other incompletely oxygenated products, and a raffinate phase containing a concentration of fatty acids which are soluble in said solvent at lower temperatures; continuously withdrawing extract and raffinate phases from said extract and raffinate phase outlets respectively; recovering a fatty acid product from said raffinate phase; chilling said extract phase to precipitate fatty acids therein; evaporating solvent from remaining extract phase and recycling the residue to said reaction zone.

3. A process for synthesizing fatty acids by the catalytic oxidation of hydrocarbon waxes having a molecular carbon content in the range between about 16 and about 30 carbon atoms, which involves the steps of: continuously flowing said waxes in a liquid state through a reaction zone and intimately contacting said waxes with gaseous oxygen and an oxidation catalyst therein; continuously withdrawing effluent from said zone and introducing said effluent into a vertically extended fractionation zone having a solvent inlet and a raffinate phase outlet near the lower end, an extract phase outlet near the upper end, and an effluent inlet in the intermediate portion; continuously introducing into said zone through said solvent inlet a solvent having a critical temperature not exceeding about 450° F. and countercurrently contacting said effluent with said solvent under liquefying pressure; adjusting the temperatures within said fractionation zone in the range near the critical temperature of the solvent in which solubility decreases as temperature increases to separate said solvent and effluent mixture into an extract phase containing a concentration of alcohols and other incompletely oxygenated products, and a raffinate phase containing a concentration of fatty acids which are soluble in said solvent at lower temperatures; continuously withdrawing extract and raffinate phases from said extract and raffinate phase outlets respectively; recovering a fatty acid product from said raffinate phase; separating at least part of the solvent from said extract phase; returning a portion of the modified extract phase to said fractionation zone at a point above said effluent inlet to serve as reflux liquid therein; chilling the remaining extract phase to a temperature between −10° F. and +20° F. to precipitate fatty acids; separating said fatty acids and chilling the filtrate to a temperature between −20° and −50° F. to precipitate unconverted wax and recycling said wax to said reaction zone.

NORMAN L. DICKINSON.

References Cited in the file of this patent

UNITED STATES PATENTS

| Number | Name | Date |
| --- | --- | --- |
| 2,118,915 | Butz et al. | May 31, 1938 |
| 2,270,674 | Pilat et al. | Jan. 20, 1942 |
| 2,318,669 | Carr | May 11, 1943 |
| 2,348,191 | Camelford | May 9, 1944 |
| 2,391,236 | Hirsch | Dec. 18, 1945 |